(12) United States Patent
Grohoski et al.

(10) Patent No.: US 8,412,911 B2
(45) Date of Patent: Apr. 2, 2013

(54) SYSTEM AND METHOD TO INVALIDATE OBSOLETE ADDRESS TRANSLATIONS

(75) Inventors: Gregory F. Grohoski, Bee Cave, TX (US); Paul J. Jordan, Austin, TX (US); Mark A. Luttrell, Cedar Park, TX (US); Zeid Hartuon Samoail, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 533 days.

(21) Appl. No.: 12/493,923

(22) Filed: Jun. 29, 2009

(65) Prior Publication Data

US 2010/0332786 A1 Dec. 30, 2010

(51) Int. Cl.
*G06F 12/00* (2006.01)
*G06F 13/00* (2006.01)
*G06F 13/28* (2006.01)

(52) U.S. Cl. ........ 711/207; 711/141; 711/142; 711/143; 711/144; 711/145; 711/146; 711/147; 711/201; 711/202; 711/203; 711/204; 711/205; 711/206; 711/210

(58) Field of Classification Search .................. None
See application file for complete search history.

(56) References Cited

U.S. PATENT DOCUMENTS

| | | | |
|---|---|---|---|
| 5,317,705 A | 5/1994 | Gannon et al. | |
| 5,428,757 A | 6/1995 | Sutton | |
| 5,437,017 A | 7/1995 | Moore et al. | |
| 5,487,162 A | 1/1996 | Tanaka et al. | |
| 5,497,480 A | 3/1996 | Hayes et al. | |
| 5,497,780 A | 3/1996 | Zehender | |
| 5,892,970 A * | 4/1999 | Hagersten | 710/5 |
| 5,906,001 A | 5/1999 | Wu et al. | |
| 5,960,463 A | 9/1999 | Sharma et al. | |
| 6,119,204 A | 9/2000 | Chang et al. | |
| 6,560,664 B1 | 5/2003 | Carlson | |
| 6,633,967 B1 * | 10/2003 | Duncan | 711/207 |
| 6,662,289 B1 | 12/2003 | Ang | |
| 6,775,747 B2 | 8/2004 | Venkatraman | |
| 7,383,415 B2 | 6/2008 | Jordan et al. | |
| 7,454,590 B2 | 11/2008 | Jordan et al. | |
| 7,805,575 B1 * | 9/2010 | Agarwal et al. | 711/141 |

(Continued)

OTHER PUBLICATIONS

Office Action dated Aug. 22, 2007 in U.S. Appl. No. 11/222,577, 9 pages.

(Continued)

*Primary Examiner* — Yaima Campos
(74) *Attorney, Agent, or Firm* — Robert C. Kowert; Meyertons, Hood, Kivlin, Kowert & Goetzel, P.C.

(57) ABSTRACT

A system and method for invalidating obsolete virtual/real address to physical address translations may employ translation lookaside buffers to cache translations. TLB entries may be invalidated in response to changes in the virtual memory space, and thus may need to be demapped. A non-cacheable unit (NCU) residing on a processor may be configured to receive and manage a global TLB demap request from a thread executing on a core residing on the processor. The NCU may send the request to local cores and/or to NCUs of external processors in a multiprocessor system using a hardware instruction to broadcast to all cores and/or processors or to multicast to designated cores and/or processors. The NCU may track completion of the demap operation across the cores and/or processors using one or more counters, and may send an acknowledgement to the initiator of the demap request when the global demap request has been satisfied.

17 Claims, 7 Drawing Sheets

U.S. PATENT DOCUMENTS

2004/0073755 A1* 4/2004 Webb et al. .................. 711/144
2004/0103248 A1 5/2004 Hass et al.
2004/0215898 A1* 10/2004 Arimilli et al. ............... 711/144
2005/0033925 A1* 2/2005 Wilson et al. ................ 711/133
2005/0172099 A1 8/2005 Lowe
2007/0061548 A1* 3/2007 Jordan et al. ................ 711/207

OTHER PUBLICATIONS

Office Action dated Nov. 1, 2007 in U.S. Appl. No. 11/222,577, 13 pages.

* cited by examiner

SYSTEM AND METHOD TO INVALIDATE OBSOLETE ADDRESS TRANSLATIONS

BACKGROUND OF THE INVENTION

1. Field of the Invention

This invention relates to multithreaded processors and, more specifically, to a hardware-based method for invalidating obsolete virtual to physical address translations and/or real to physical address translations.

2. Description of the Related Art

Modern computer systems typically include virtual memory space that is shared between multiple processors within a system. Virtual addresses are produced by the processors for each instruction fetch or load or store access to memory. Addresses within the virtual memory space are translated into physical memory addresses, which are used to access physical memory locations. These virtual to physical address translations are typically stored in page tables. In an effort to improve processor performance, a subset of the virtual to physical address translations stored in the page tables may be cached in translation lookaside buffers (TLBs). The TLBs may improve processor performance by decreasing the amount of time required for a processor to determine an actual, physical memory location for an instruction or data. Many TLBs may exist in a multiprocessor computer system, as each processor may include multiple TLBs.

TLBs may be managed entirely by software, or may be managed by a combination of hardware and software techniques. For example, some implementations reload missing TLB entries via a hardware mechanism referred to as hardware table walk. When a virtual address misses in the TLB, the hardware table walk engine searches a set of page tables located in physical memory to find a matching translation. If one is found, hardware updates the TLB; otherwise, hardware signals an exception, and higher-level software resolves the exception. Even in systems that include hardware table walk, software is typically used to manage the TLBs. In particular, when the virtual to physical address maps stored in the page tables change, software is used to remove stale mappings from the TLBs.

A variety of system events may result in changes to the virtual memory space, thus rendering the virtual to physical address translations obsolete. Address maps may change, for example, as a result of migrating virtual pages to disk, terminating processes, allocating virtual memory, or performing disk or network I/O. In response to these events, the page tables storing the obsolete translations may need to be invalidated. Accordingly, the obsolete address translations stored in all of the TLBs in a system may also need to be invalidated, or demapped. The demap process is typically handled by software operations, which require processing of an interrupt for each TLB within each processor in a system. Processing software interrupts to support demapping operations across multiple cores within multiple processors in a system may require significant system overhead, which can result in decreased system performance. As the number of cores within a processor and/or the number of processors within a system increases, the overhead required to process software interrupts for demap operations also increases, particularly for system applications that require frequent changes to the virtual memory space.

SUMMARY

Various embodiments of a system and method for invalidating obsolete virtual to physical address translations are disclosed. In some embodiments, translation lookaside buffers (TLBs) may be used to cache a subset of the virtual to physical address translations mapping virtual system memory to physical memory. System events such as migration of virtual pages to disk storage may result in changes to the virtual memory space in a system, which may require that at least some of the virtual to physical address translations stored in one or more TLBs within a system are invalidated, or demapped.

The system described herein may, in some embodiments, be configured to process a global demap operation, i.e. to apply an operation to demap one or more invalid entries to all TLBs (or all affected TLBs) in a system, via hardware. In some embodiments, a global demap request may be issued by a process running on a thread within a core of a processor. The global demap operation may include an internal demap operation, i.e. a demap operation applied to all TLBs within cores on the same processor as the core that initiated the demap, and an external demap operation, i.e. a demap operation applied to all TLBs within cores on other processors within the system. In some embodiments, a demap manager may be configured to manage a global demap operation. For example, a demap manager may be implemented within a non-cacheable unit (NCU) residing on the processor. In this example, an NCU may receive a global demap request from a core residing on the same processor as the NCU. In some embodiments, the NCU may be configured to issue an internal demap request to all cores within the processor. The NCU may be configured to issue an external demap request to NCUs residing on all other processors within the system. The NCU may be configured to track acknowledgements indicating completion of the demap operation from each core within the processor and from each processor within the system. In response to receiving acknowledgements from all cores and all external processors that the targeted TLB entry or entries have been invalidated, the NCU may be configured to send an acknowledgement to the initiating core that the global demap request has been satisfied.

In some embodiments, the NCU may be configured to send a demap request to enabled cores within a processor. A core may be enabled if the clocks within the core are functioning in a normal state. The NCU may be configured such that it does not send a demap request to any cores within the processor that are disabled. In some embodiments, software may not be allowed to change the enabled status of a core when a global TLB demap request is in process. Disabling a core during processing of a TLB demap operation may result in the system hanging, as the NCU may wait indefinitely for acknowledgment from the disabled core. In some embodiments, the NCU may be configured to broadcast a global TLB demap request to all enabled cores within a processor and/or all processors within a system. In other embodiments, the NCU may be configured to multicast the global TLB demap request to designated cores and/or processors within the system.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e. meaning having the potential to) rather than the mandatory sense (i.e. meaning must). Similarly, the words "include", "including", and "includes" mean including, but not limited to.

DETAILED DESCRIPTION OF EMBODIMENTS

Overview of Multithreaded Processor Architecture

Figure 1:
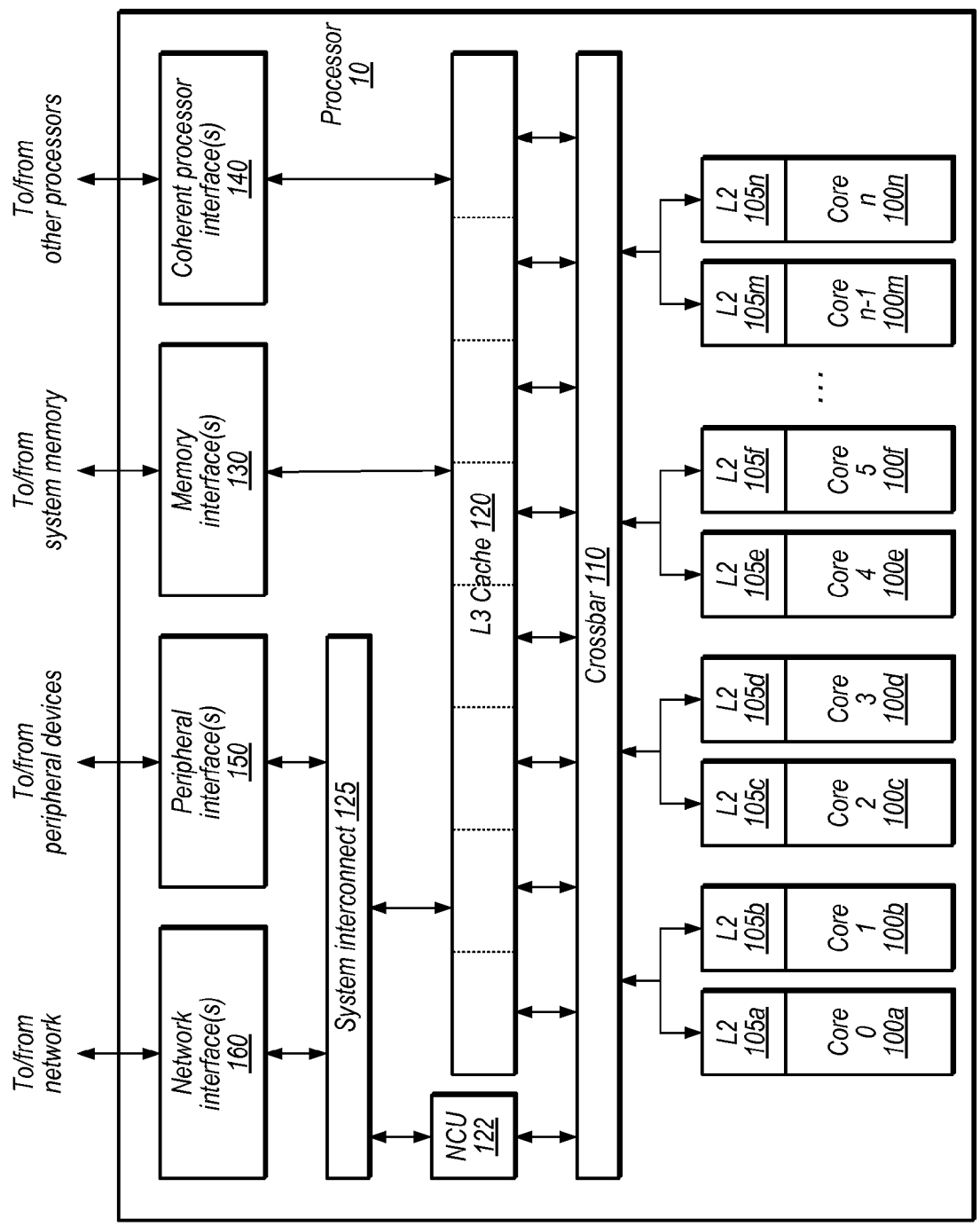
FIG. 1 is a block diagram illustrating one embodiment of a multithreaded processor.

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In some embodiments, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In some embodiments, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in some embodiments, each core 100 may have a dedicated corresponding L2 cache 105. In some embodiments, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In some embodiments, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In some embodiments, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In some embodiments, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in some embodiments crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in some embodiments, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e. capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In some embodiments, peripheral interface 150 may implement one or more instances of a standard peripheral interface. For example, some embodiments of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In some embodiments, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in some embodiments each of cores 100 may be configured for multithreaded, out-of-order execution. More specifically, in some embodiments, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In some embodiments, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In some embodiments, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
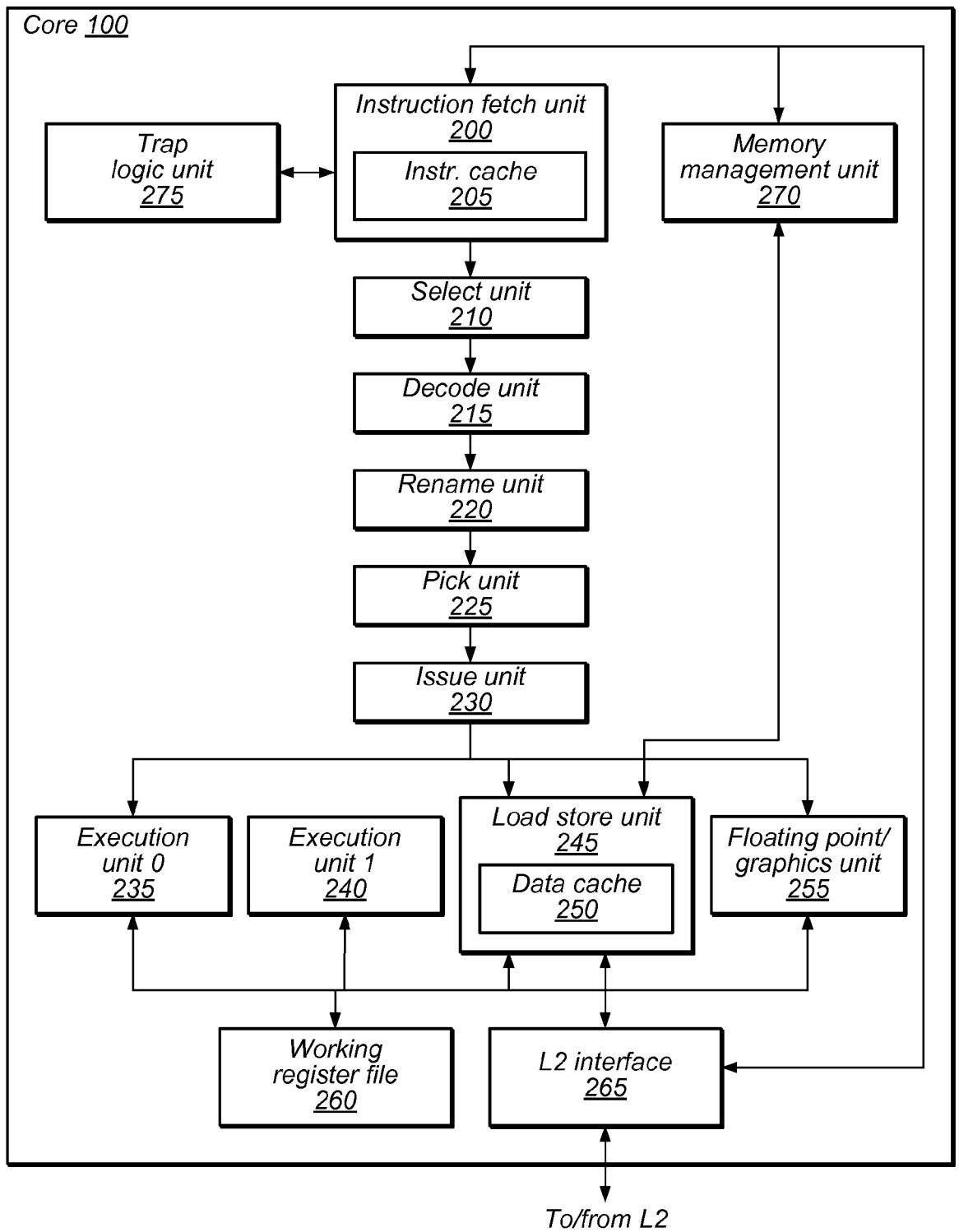
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, various embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In some embodiments, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In some embodiments, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in some embodiments, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In some embodiments, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In some embodiments, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e. destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In some embodiments, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In some embodiments, rename unit 220 may be configured to rename the logical (i.e. architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In some embodiments, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In some embodiments, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e. user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In some embodiments, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculations for load/store instructions executed by LSU 245. EXU1 240 may be configured to execute integer instructions issued from slot 1, as well as branch instructions. In some embodiments, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In some embodiments, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In some embodiments, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in some embodiments FGU 255 may implement single- and double-precision floating-point arithmetic instructions compliant with the IEEE 754-1985 floating-point standard, such as add, subtract, multiply, divide, and certain transcendental functions. Also, in some embodiments FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in some embodiments FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In some embodiments, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e. FGU 255 may be capable of starting one new instruction per execution cycle), partially pipelined, or may block issue until complete, depending on the instruction type. For example, in some embodiments floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In some embodiments, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In some embodiments, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In some embodiments, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, MMU 270 may be configured to provide a translation. In some embodiments, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e. a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In some embodiments, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In some embodiments, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In some embodiments, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e. a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In some embodiments, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Invalidating Virtual to Physical Address Translations

As described above, multiprocessor systems may consist of multiple processor cores, each of which may be threaded. In various embodiments, the cores may be interconnected on one chip via an on-chip interconnection network (such as a crossbar). In some embodiments, multiple processor chips may be configured into a multiple-socket system. In such embodiments, these cores may communicate with external agents (such as other processor chips) by sending external requests to an on-chip agent, such as the non-cacheable unit (NCU) described above. An NCU may be configured to process requests from various cores for non-cacheable data, such as data from I/O devices. It may also be configured to direct external requests to the appropriate destination(s), including to the NCUs of other processors in a multiprocessor system. In some embodiments, the NCU may include a demap manager. In such embodiments, the demap manager within the NCU may be configured to issue and synchronize global TLB demap operations, as described below. In other embodiments, a demap manager may be implemented as a standalone module within the processor, or as a module of another functional unit within the processor.

As described above, one or more translation lookaside buffers (TLBs) may be used to cache a subset of the virtual to physical address translations mapping virtual system memory to physical memory, e.g., recently generated or frequently accessed virtual address to physical address translations. In some embodiments, multiple levels of address virtualization may be implemented. For example, real addresses may be provided to privileged software and may describe the underlying physical memory allocated to the privileged software. In such embodiments, one or more TLBs may be configured to cache real to physical address translations in addition to or instead of virtual to physical address translations. The TLBs may improve processor performance by decreasing the amount of time required for a processor to determine an actual, physical memory location for an instruction or data. In some embodiments, a memory management unit, such as MMU 270, may be configured to manage the translation of virtual addresses to physical addresses used within a core, such as core 100. For example, in some embodiments, an instruction translation lookaside buffer (ITLB) may physically reside in IFU 200, and a data translation lookaside buffer (DTLB) may physically reside in LSU 245. In a multi-core processor, each core in the processor may be configured to include both an ITLB and a DTLB. The TLBs residing within each core may store a number of recently generated or frequently accessed translations, which may enable rapid translation of virtual addresses during lookup of instruction cache 205 or data cache 250.

Various system events, such as the migration of virtual pages to disk storage, the termination of processes, the allocation of virtual memory, or the performance of disk or network I/O operations, may result in changes to the virtual to physical address translations. In some embodiments, changes to the virtual to physical address translations may result in obsolete TLB entries, since the TLB entries may store the previous address translations. Thus, in some embodiments, in response to a change in the virtual to physical address translations, the corresponding TLB entries may need to be invalidated or demapped. If the obsolete address translations in a TLB are not demapped, the next process requesting a virtual to physical address translation from the TLB may receive an obsolete address translation and, as a result, may receive incorrect data from the physical address location accessed. In some embodiments, one or more entries in all TLBs within each core on each processor in a system may need to be demapped in response to a change in the virtual to physical address translations. An operation that demaps one or more entries of all TLBs in a system (or all affected TLBs in the system) may be referred to as a global TLB demap operation.

In some embodiments, any process executing on a core within a processor may be capable of issuing a global demap request, thus initiating a global TLB demap operation in the system. A global TLB demap operation may include an internal TLB demap operation, i.e. a demap operation applied to all TLBs residing on all cores within the same processor as the core issuing the global demap request. A global TLB demap operation may also include an external TLB demap operation, i.e. a demap operation applied to all TLBs on all processors within the system other than the processor from which the global demap request was issued. As described above, processing a global TLB demap operation across multiple cores residing in multiple processors within a system via software may result in significant system overhead due to the large number of interrupts that may need to be processed. A hardware solution for processing the global TLB demap operation, such as that described herein, may decrease system overhead requirements. In such embodiments, interrupts may be no longer be required for processing the global TLB demap operation, therefore, the number of execution cycles required to the complete the global TLB demap operation may be significantly reduced. In some embodiments, the number of execution cycles required to process a hardware-managed global TLB demap operation may be an order of magnitude less than the number of execution cycles required to process a software-managed global TLB demap operation. For example, hundreds of cycles may be required to process a hardware-managed global TLB demap operation, while thousands of cycles may be required to process a software-managed global TLB demap operation.

In some embodiments, a demap manager module, which may be included within a non-cacheable unit (NCU) 122, may be configured to manage a global TLB demap operation. As shown in FIG. 1, NCU 122 may be configured to communicate with cores 100 via crossbar 110. NCU 122 may be configured to communicate with remote NCUs residing on other processors within the system via a system bus (not shown). As will be described in detail below, NCU 122 (or a demap manager thereof) may be configured to manage an internal TLB demap operation within processor 10 and NCU 122 (or a demap manager thereof) may be configured to manage an external TLB demap operation across all processors in the system, in response to receiving a global TLB demap request originating from a core within processor 10.

Figure 3:
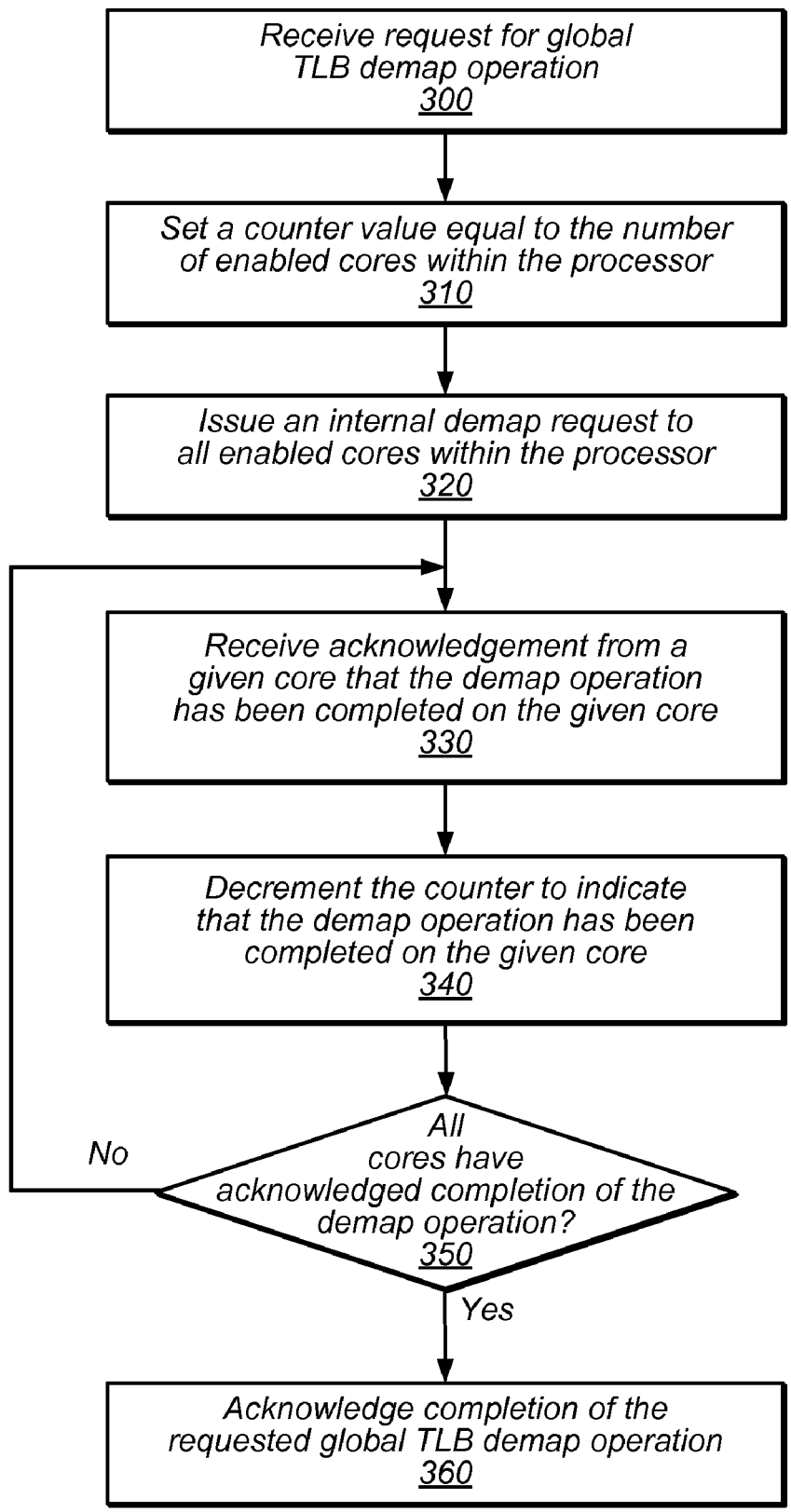
FIG. 3 is a flowchart illustrating a method for processing an internal TLB demap operation on multiple cores within a processor, according to various embodiments.

As described above, processing a global TLB demap operation may in some embodiments include applying a demap operation to TLBs residing within cores on the same processor as the core which issued the global TLB demap request. FIG. 3 illustrates a method for applying an internal demap operation to multiple cores within a processor, according to various embodiments. In this example, the method may include receiving a request for a global TLB demap operation, as in 300. The request may identify one or more invalid virtual to physical address translations that should be demapped. In some embodiments, the request for a global TLB demap operation may be initiated by a thread operating within a core on the processor. In some embodiments, the global demap request may be received by a module residing on the same processor as the core from which the request was issued. For example, as described above, NCU 122 may be configured to receive the request for a global TLB demap operation. NCU 122 may be configured to manage the global TLB demap operation internally within the processor, applying the demap operation to all TLBs (or all affected TLBs) within the cores on the processor.

NCU 122 may include a counter configured to maintain a count of all cores within the processor that have received a request to invalidate one or more address translations but that have not yet returned an acknowledgement that the address translation(s) have been invalidated within the core. As shown in 310, the method may include setting the value of this counter equal to the number of cores within the processor. For example, NCU 122 may be configured to set the counter value equal to eight if there are eight cores within the processor. In other embodiments, a counter within the NCU may be configured to track cores that have returned an acknowledgement that the address translation(s) have been invalidated within the core. In such embodiments, the operation shown as 310 in FIG. 3 may include initializing the counter to a value of zero, rather than initializing it to a value reflecting the number of cores. In some embodiments, a value indicating the number of cores (or enabled cores) within the processor may be available in a register local to the NCU. In various embodiments, this register value may be updated by software (e.g., operating system software) or a service processor to reflect an initial system configuration or in response to system configuration changes.

In some embodiments, individual cores within a processor may be enabled or disabled. As described above, NCU 122 may be configured to send demap requests only to enabled cores. In some embodiments, the clocks of a disabled core may be disabled, preventing the core from executing instructions. In such embodiments, a demap request may not be issued to any disabled cores. In some embodiments, individual threads of a core may be parked. A parked thread may not be able to execute instructions. In some embodiments, if all threads of a core are parked, the core may not be able to execute instructions. However, the core may still be enabled, with clocks functioning normally. In this case, since the core is enabled, it may still receive demap requests from NCU 122. Therefore, the parked or unparked status of threads on a core may not affect the core's ability to receive and process demap requests. In some embodiments, the number of enabled cores within a processor may not be changed by software while a global TLB demap operation is being processed. Disabling a core during processing of a demap operation may result in the system hanging, as NCU 122 may wait indefinitely for an acknowledgement that the targeted invalid entry or entries have been demapped from a core that was disabled after a demap request was issued but before such an acknowledgement was sent.

As illustrated at 320 in FIG. 3, the method may include issuing an internal demap request to all of the cores, or all of the enabled cores, within the processor. For example, in response to detection of eight enabled cores within the processor, NCU 122 may be configured to broadcast a demap request to each of the eight enabled cores on the processor. In this example, the method may include receiving acknowledgement from a given core within the processor that the requested demap operation has been completed on the core, as shown in 330. As illustrated in FIG. 3, in embodiments in which the counter value was initialized to match the number of cores, the method may include decrementing the counter to indicate that the given core has completed the demap operation, as shown in 340. For example, NCU 122 may be configured to receive an acknowledgement of the completion of the demap operation from one of the eight enabled cores on the processor and, in response to receiving the acknowledgement, to decrease the counter value to seven. In embodiments in which the counter value was initialized to zero, the counter may be incremented to indicate that the demap operation has been completed on the given core in response to receiving such an acknowledgement.

As illustrated in FIG. 3, the method may include examining the value of the counter to determine whether all cores on the processor have acknowledged completion of the requested demap operation, as shown in 350. If not all of the cores have acknowledged completion of the demap operation, shown as the negative exit of 350, the method may include repeating the operations illustrated as 330 and 340, shown as the feedback from 350 to 330. For example, in embodiments in which the counter value was initialized to match the number of cores, in response to determining that the counter value is greater than zero, NCU 122 may be configured to continue to receive acknowledgements of completed demap operations from additional cores, and to decrement the counter accordingly, until all of the cores have acknowledged completion of the demap operation. In embodiments in which the counter value was initialized to zero, the method may include continuing to receive acknowledgements until the counter reaches a value equal to all enabled cores on the processor, indicating that all cores have completed the demap operation.

As shown by the positive exit of 350, once all of the cores have acknowledged completion of the demap operation (e.g., in response to determining that the counter value is equal to zero), the method may include acknowledging completion of the requested global TLB demap operation, as shown in 360. For example, NCU 122 may be configured to send an acknowledgement indicating that the request to demap one or more invalid entries within the TLBs of one or more cores has been satisfied to the core that issued the request, in some embodiments. Note that in various embodiments, an internal demap operation within a processor may be managed by a module or group of modules other than NCU 122 (e.g., by a standalone demap manager, by a demap manager module within another functional unit of the processor, or by logic distributed among two or more functional units that collectively provides the functionality of a demap manager). In various embodiments, different methods may be used to manage a counter that tracks such acknowledgements from the local cores, or the tracking of such acknowledgements may be managed using a mechanism other than a counter.

Figure 4:
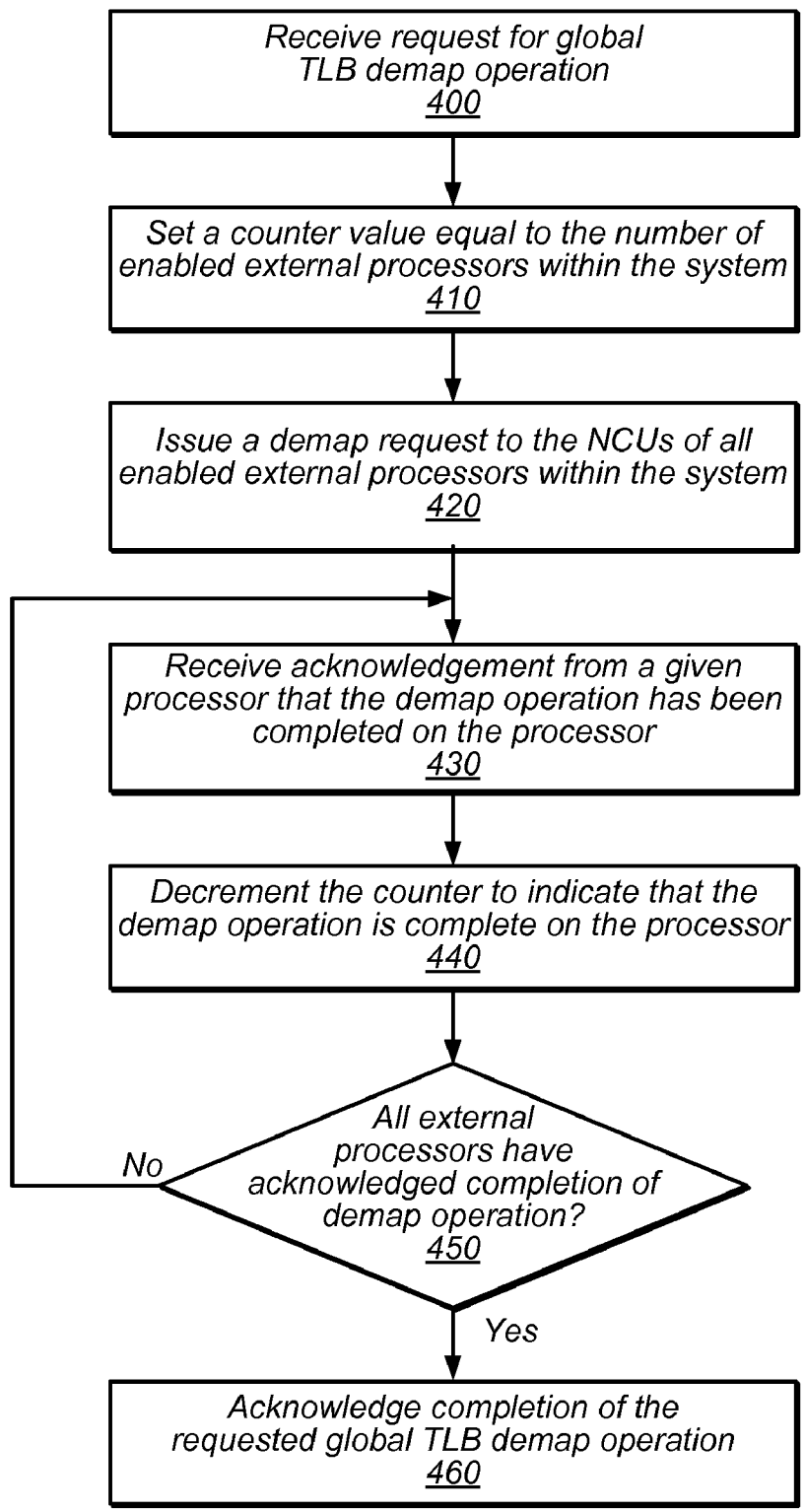
FIG. 4 is a flowchart illustrating a method for processing an external TLB demap operation on multiple processors within a multiprocessor system, according to various embodiments.

As described above, a global TLB demap operation may in some embodiments include an external demap operation, i.e. one that applies a demap operation to TLBs on processors other than the processor from which the global TLB demap request originated. FIG. 4 illustrates a method for processing an external demap operation on multiple processors within a multiprocessor system, according to various embodiments. In this example, the method may include receiving a request for a global TLB demap operation, as in 400. The request may identify one or more invalid virtual to physical address translations that should be demapped. As previously described, the request for a global TLB demap operation may be initiated by a thread operating within any core on one of the processors. In some embodiments, the core may issue the global TLB demap request to a module, such as NCU 122, residing on the same processor as the core.

NCU 122 may include a counter configured to maintain a count of all processors in a multiprocessor system that have received a request to invalidate one or more address translations but that have not yet returned an acknowledgement that the address translation(s) have been invalidated within the processor. As shown in 410, the method may include setting the value of this counter equal to the number of enabled external processors within the system. For example, NCU 122 may be configured to set a counter value equal to four in response to detection of four enabled external processors within the system. In other embodiments, a counter may be configured to track the number of processors that have returned such an acknowledgement. In such embodiments, the operation shown as 410 in FIG. 4 may include initializing the counter to a value of zero. In some embodiments, a value indicating the number of enabled processors within the multiprocessor system may be available in a register local to the NCU. In various embodiments, this register value may be updated by software (e.g., operating system software) or a service processor to reflect an initial system configuration or in response to system configuration changes. As illustrated at 420 in FIG. 4, the method may include issuing a demap request to the NCUs of all of the external enabled processors within the system. For example, NCU 122 may be configured to broadcast a demap request to the NCU residing on each of the four enabled processors in the system.

In the example illustrated in FIG. 4, the method may include receiving an acknowledgement from the NCU of a given one of the processors that the requested demap operation has been completed on the processor, as shown in 430. As illustrated in FIG. 4, the method may include decrementing the counter to indicate that the requested demap operation has been completed on the given processor, as shown in 440. For example, NCU 122 may be configured to receive an acknowledgement that the requested demap operation has been completed from one of the four enabled processors in the system and, in response to receiving the acknowledgement, to decrease the counter value to three.

As illustrated at 450 in FIG. 4, the method may include examining the value of the counter to determine whether all external processors within the system have acknowledged completion of the requested demap operation. If all processors have not acknowledged completion of the requested demap operation, shown as the negative exit of 450, the method may include repeating the operations illustrated as 430 and 440, shown as the feedback from 450 to 430. For example, in response to determining that the counter value is greater than zero, NCU 122 may be configured to continue to receive acknowledgements of completed demap operations from additional processors, and to decrement the counter accordingly, until all of the processors have acknowledged completion of the demap operation. In embodiments in which the counter is initialized to zero, NCU 122 may be configured to increment the counter in response to receiving an acknowledgement from a given processor, and to continue to receive acknowledgements of completed demap operations from additional processors (and increment the counter accordingly), until all of the processors have acknowledged completion of the demap operation.

As shown by the positive exit of 450, once all of the processors have acknowledged completion of the demap operation (e.g., in response to determining that the counter value is equal to zero), the method may include acknowledging completion of the requested global TLB demap operation, as shown in 460. For example, NCU 122 may be configured to send an acknowledgement indicating that the request to demap one or more invalid entries within the TLBs of one or more processors has been satisfied to the NCU of the processor that includes the core that issued the request, in some embodiments. Note that in various embodiments, an external demap operation may be managed by a module or group of modules other than NCU 122 (e.g., by a standalone demap manager, by a demap manager module within another functional unit of the processor, or by logic distributed among two or more functional units that collectively provides the functionality of a demap manager). In various embodiments, different methods may be used to manage a counter that tracks such acknowledgements from external processors, or the tracking of such acknowledgements may be managed using a mechanism other than a counter.

In some embodiments, each processor in a multiprocessor system may include a local NCU which may be configured to receive a global TLB demap request from a remote NCU on another processor. The global TLB demap request may identify one or more invalid virtual to physical address translations that should be demapped. The local NCU may be configured to manage the application of the requested demap operation within the processor. For example, the NCU may be configured to employ a method similar to the method illustrated in FIG. 4 for managing an internal demap operation on all cores within the processor. The NCU may be configured to issue the demap request to all enabled cores within the processor and may be configured to receive an acknowledgement from each core when the demap operation is completed on the core. As described above, the NCU may be configured to track completion of the requested demap operation across all cores in the processor using a counter whose value is initialized to the number of enabled cores in the processor. Upon completion of the requested demap operation within the cores of the processor, the NCU may be configured to send an acknowledgement indicating that the request to demap the invalid translation(s) has been satisfied to the remote NCU that issued the global TLB demap request.

Figure 5:
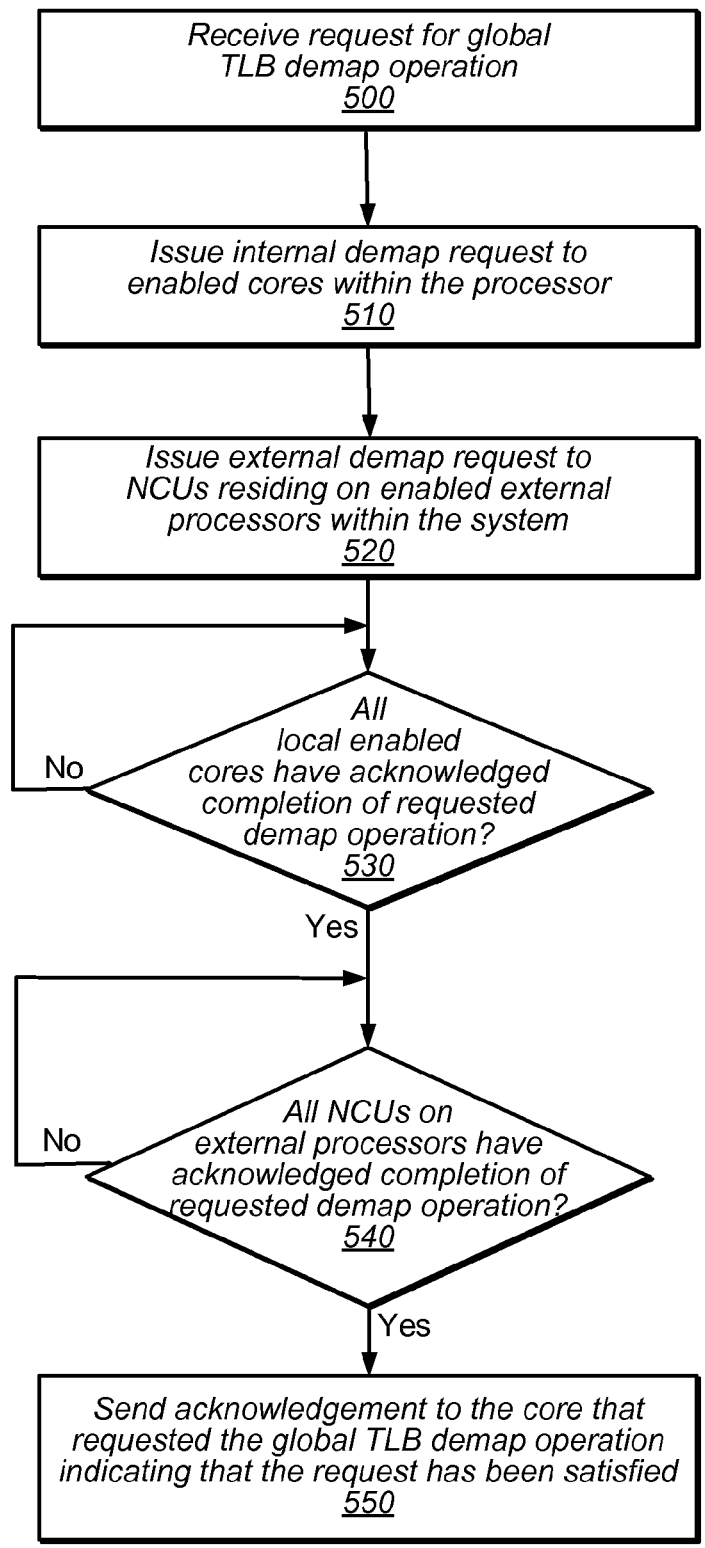
FIG. 5 is a flowchart illustrating a method for processing a global TLB demap operation within a multiprocessor system, according to various embodiments.

As described above, an NCU residing on the same processor as a core that issues a global TLB demap request may be configured to manage the application of the global TLB demap operation internally on the processor and externally on multiple processors within the system. FIG. 5 illustrates a method for processing a global TLB demap operation, according to various embodiments. As shown in 500, the method may include the NCU receiving a request for a global TLB demap operation. In response to receiving the request, the method may include the NCU issuing an internal demap request to all enabled cores within a processor. As shown in 520, the method may include issuing an external demap request to the NCU residing on each of the enabled processors within the system. For example, as described above, NCU 122 may be configured to broadcast a TLB demap request to each enabled core within the processor in which NCU 122 resides and to the remote NCU residing on each enabled external processor within the system.

As illustrated in FIG. 5, the method may include waiting to receive acknowledgements from all local enabled cores and all NCUs residing on external processors that the requested demap operation has been completed, as shown in 530 and 540, respectively. For example, NCU 122 may be configured to employ a method similar to the method described in FIG. 3 to determine that all enabled cores have completed the requested demap operation. Similarly, NCU 122 may be configured to employ a method similar to the method illustrated in FIG. 4 to determine that all enabled external processors have completed the requested demap operation. As illustrated in FIG. 5, the method may include sending an acknowledgement that the global TLB demap operation has completed to the core that issued the global TLB demap request, as shown in 550. For example, NCU 122 may be configured to send a global TLB demap complete acknowledgement to the initiating core residing on the same processor as NCU 122. In other embodiments, the operations illustrated in FIG. 5 may be performed in a different order than that shown in FIG. 5. For example, a demap request may be issued to NCUs residing on enabled external processors before it is issued to enabled cores on the processor on which the global TLB request was initiated, or may be issued to external processors at the same time that it is issued to enabled cores on the local processor. Similarly, the NCU may not wait for acknowledgement from all local cores that they have completed the requested demap operation before determining whether all external processors have acknowledged completion of the requested demap operations, but may receive and track acknowledgements from local cores and external processors, in any order, as they are received (e.g., using one or more counters or another mechanism).

Figure 6:
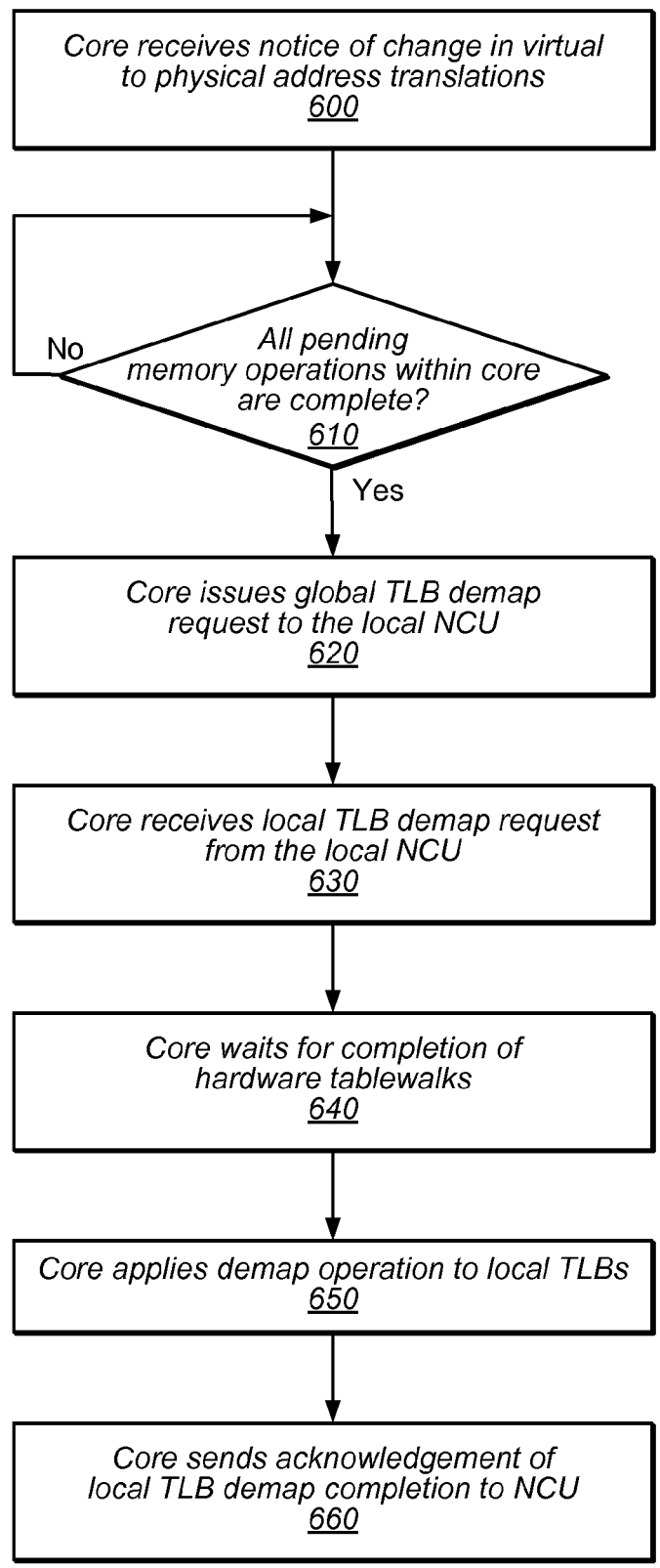
FIG. 6 is a flowchart illustrating a method for issuing a global TLB demap request and processing the TLB demap operation locally within a processor core, according to various embodiments.

In some embodiments, a core within a processor may be configured to issue a global TLB demap request to be applied to all TLBs (or all affected TLBs) within a multiprocessor system. The core may also be configured to process the demap request internally on all TLBs residing with the core. FIG. 6 illustrates a method for issuing a global TLB demap request and processing the TLB demap operation locally within a processor core, according to various embodiments. As illustrated in FIG. 6, the method may include a core receiving notice of a change in the virtual to physical address translations within the system, as shown in 600. For example, a process executing on a thread within core 100*a* may receive notice that the virtual to physical address translation mapping has changed due to a change in system-level virtual memory. In this example, the method may include waiting for all pending memory operations within the core to complete before issuing a request to demap any translations made invalid by the change, as shown in 610. For example, core 100*a* may wait for all prior loads and stores to be committed and any pending I/O space operations to be completed before issuing a demap request. As illustrated in FIG. 6, once all pending memory operations have been completed, the method may include issuing a global TLB demap request, as shown in 620. For example, core 100*a* may send a global TLB demap request to the local NCU 122 (i.e. the NCU of the same processor on which the core resides) in order to initiate the global TLB demap operation within the system. In this example, the method may include the core receiving a local demap request from the local NCU, as shown in 630. For example, core 100*a* may receive a request from NCU 122 to apply the demap operation to the TLBs residing within core 100*a*.

As illustrated in FIG. 6, the method may include the core waiting for completion of all hardware table walks before performing the requested demap operation, as in 640. As described above, in some embodiments, MMU 270 may be configured to traverse translation tables in system memory to locate an address translation not stored in a TLB. This method may be referred to as a hardware table walk. Core 100*a* may be configured to wait for any pending hardware table walks to complete before applying the requested demap operation to its local TLBs. In some embodiments, this may prevent a hardware table walk operation from re-writing an obsolete address map into a TLB after the obsolete address map has been removed by a demap operation. In some embodiments, core 100*a* may be configured to prevent any new table walks from being initiated once a demap request has been received. As illustrated in FIG. 6, the method may include applying the requested demap operation to the core's local TLBs, as shown in 650. For example, core 100*a* may be configured to perform the requested demap operation on the TLBs within the core by removing one or more invalidated entries from the TLBs. In some embodiments, a demap request may include a key that identifies one or more TLB entries to be demapped. The TLB may be configured to clear a valid bit for each TLB entry identified by the key. In various embodiments, the demap request may identify a single TLB entry to be demapped, or multiple TLB entries to be demapped, or may indicate that all TLB entries should be demapped. In some embodiments, a demap operation may be applied atomically on all TLBs residing within a core. In other words, the demap operation may appear to be applied to all of the TLBs in a single operation (i.e. without any intervening changes to any of the TLBs), or not at all. As illustrated in FIG. 6, the method may include sending an acknowledgement that the local demap operation within the core is complete, as in 660. For example, core 100*a* may be configured to send an acknowledgement to NCU 122 that the targeted invalid entries in all TLBs within the core have been demapped. As previously noted, in some embodiments various TLBs may be configured to store real to physical address translations. In such embodiments, the methods described herein for invalidating obsolete virtual to physical address translations across multiple cores and/or processors may be employed to invalidate obsolete real to physical address translations across multiple cores and/or processors.

In some embodiments, a system may be configured to support multiple pending global TLB demap requests. In such embodiments, these pending requests may be initiated by multiple cores within a processor and/or by multiple cores across multiple processors. In some embodiments, an NCU residing on each processor within the system may be configured to support the multiple demap requests via pipelining of the requests. For example, NCU 122 may be responsible for controlling the processing order of demap requests and prioritizing the requests with regard to other operations pending within the core. In this case, NCU 122 may be configured to prioritize a newly received demap request lower than any currently pending demap requests. In some embodiments, NCU 122 may prioritize pending demap requests in a serial manner, e.g., processing the oldest requests first. In some embodiments, a processor may include a MEMBAR #Sync special operation which may force all outstanding instructions to be completed and all stores to be globally visible before initiating any further instructions. This MEMBAR #Sync instruction may affect a pending queue of demap requests held by NCU 122. For example, once a MEMBAR #Sync instruction is issued, NCU 122 may wait until all pending TLB demap requests have been completed before issuing any further operations.

As described above, any process executing on a thread of a processor core may be configured to issue a global TLB demap request. In some embodiments, this functionality may be enabled by defining an address space identifier (ASI) operation that performs a global TLB demap operation. In some embodiments, a global TLB demap instruction may be added to an existing instruction set previously supporting only local demap ASIs. For example, an encoding representing the TLB demap type within the existing TLB demap ASI may be changed. In this example, a new bit encoding may specify that either a global TLB demap operation or local TLB demap operation is to be performed, rather than providing only an option for a local TLB demap operation. For example, in one embodiment, hardware supporting an existing STXA instruction (i.e. an instruction used to store an extended word into an alternate space) may be modified to support global demap operations in addition to local demap operations. In this example, the hardware instruction STXA to ASI 0x57 may indicate an ITLB demap, and the hardware instruction STXA to ASI 0x5F may indicate a DTLB demap, with the encoding of bit 3 specifying whether the demap operation is to be applied to the ITLB or DTLB. The upper bits of the data field may be configured to indicate the virtual address or real address to be demapped. In some existing implementations of the STXA instruction, bit 9 may be configured as a global bit, in which a value of zero indicates a local demap request. In some embodiments, the implementation of the STXA instruction may be modified such that a value of one in bit 9 indicates a global demap request.

While the examples above describe embodiments that include broadcasting a demap request to all enabled cores within a processor and/or all enabled external cores within a system, in other embodiments, multicasting demap requests may be possible. In some embodiments, NCU 122 may be configured to multicast a demap request, sending the request only to designated individual cores and/or processors. In such embodiments, the designated cores and/or processors receiving the demap request may apply the requested demap operation while other cores and/or processors continue normal operations without applying the demap operation. For example, multicasting of a demap request may be supported by encoding a multicast vector in an instruction address field, where each bit in the address may correspond to a particular core or processor. In another example, the demap instruction may implicitly reference a separate register that contains a multicast vector identifying the cores and/or processors on which to apply the demap operation. In this case, for example, a demap request to be broadcast may be represented by setting all bits in the vector equal to one, and a demap request to be multicast may be represented by setting only the those bits corresponding to particular cores or processors to one. In yet another example, the type of demap request, i.e. broadcast or multicast, may be represented by encoding a particular bit in the instruction data field such that the bit indicates multicast or broadcast.

Example System Embodiment

Figure 7:
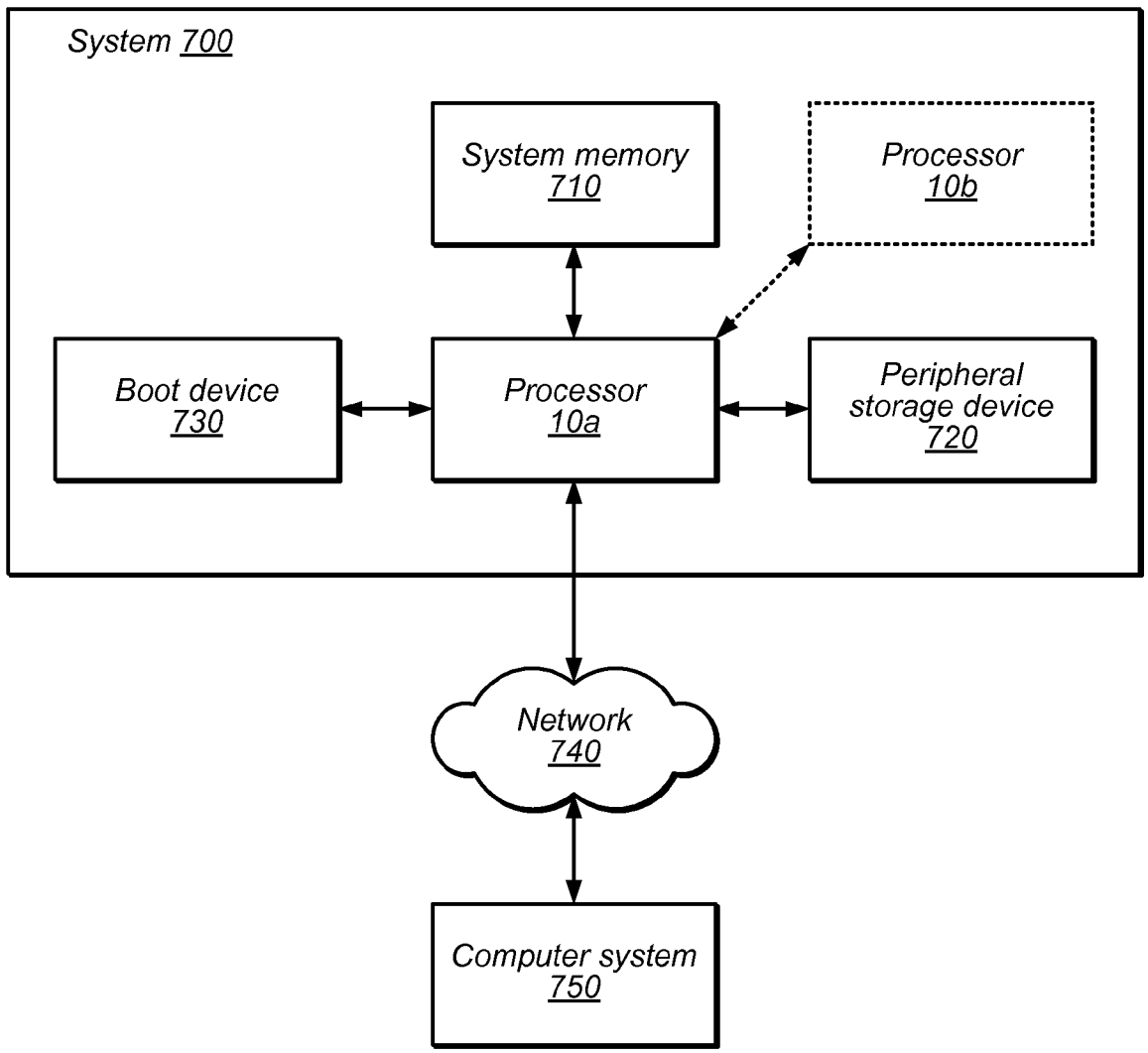
FIG. 7 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 7. In the illustrated embodiment, system 700 includes an instance of processor 10, shown as processor 10*a*, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10*a* may optionally be coupled to one or more other instances of processor 10, shown in FIG. 7 as processor 10*b*. For example, processors 10*a-b* may be coupled to communicate via their respective coherent processor interfaces 140.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In some embodiments, peripheral storage device 720 may be coupled to processor 10 via peripheral interface(s) 150 of FIG. 1.

As described previously, in some embodiments boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
receiving, by a demap manager of a processor, a global demap request for invalidation of an address translation from an initiating one of a plurality of cores, wherein the address translation maps a virtual memory address or a real memory address to a physical memory address, wherein the demap manager is a hardware unit of the processor separate from the plurality of cores;
in response to the global demap request, performing, by the demap manager of the processor both an internal demap operation and an external demap operation;
wherein performing the internal demap operation comprises sending, by the demap manager of the processor, a request to one or more of the plurality of cores other than the initiating core to invalidate the address translation within each of the one or more cores;
wherein performing the external demap operation comprises sending, by the demap manager of the processor, a request to one or more other demap managers of one or more other processors to invalidate the address translation in one or more cores of the one or more other processors;
receiving, by the demap manager of the processor, an internal acknowledgement that the address translation has been invalidated within at least one of the one or more cores;
receiving, by the demap manager of the processor, an external acknowledgement from at least one of the one or more other processors that the address translation has been invalidated within the at least one of the one or more other processors;
determining, by the demap manager of the processor, whether the address translation has been invalidated within all of the one or more cores of the processor and all of the one or more cores of the one or more other processors; and
in response to determining, by the demap manager of the processor, that the address translation has been invalidated within all of the one or more cores of the processor and all of the one or more cores of the one or more other processors, sending an acknowledgement to the initiating one of the plurality of cores that the request for invalidation has been satisfied.

2. The method of claim 1, wherein said determining comprises determining whether a value of a counter indicates that the address translation has been invalidated within all of the one or more cores.

3. The method of claim 1, wherein the plurality of cores comprises two or more cores within a processor.

4. The method of claim 1, wherein said determining whether the address translation has been invalidated comprises determining whether a value of a counter indicates that the address translation has been invalidated within all of the one or more of the one or more processors other than the processor comprising the initiating one of the plurality of cores.

5. The method of claim 1, further comprising:
the one of the plurality of cores ensuring that any pending memory operations have been completed prior to sending the request for invalidation of an address translation.

6. The method of claim 1, wherein said sending a request comprises multicasting the request to the one or more cores.

7. The method of claim 1, wherein the request for invalidation of an address translation comprises a request to demap an entry of a translation lookaside buffer.

8. The method of claim 1, wherein the request for invalidation of an address translation comprises a request to demap two or more entries of a translation lookaside buffer.

9. The method of claim 1, wherein said sending a request comprises broadcasting the request to all enabled cores of the plurality of cores.

10. A processor, comprising:
one or more cores, at least one of which is configured to send a global demap request for invalidation of an address translation, wherein the address translation maps a virtual memory address or a real memory address to a physical memory address; and
a hardware unit of the processor separate from the one or more cores, wherein the hardware unit comprises a demap manager configured to:
receive the global demap request for invalidation of an address translation;
in response to the global demap request, perform both an internal demap operation and an external demap operation;
wherein to perform the internal demap operation the demap manager is configured to send a request to a plurality of cores of the processor to invalidate the address translation within each core;
wherein to perform the external demap operation the demap manager is configured to send a request to one or more other demap managers of one or more other processors to invalidate the address translation in one or more cores of the one or more other processors;
receive an internal acknowledgement that the address translation has been invalidated within at least one of the plurality of cores of the processor;
receive an external acknowledgement from at least one of the one or more other processors that the address translation has been invalidated within the at least one of the one or more other processors;
determine whether the address translation has been invalidated within all of the plurality of cores of the processor and all of the one or more cores of the one or more other processors; and
in response to determining that the address translation has been invalidated within all of the plurality of cores of the processor and all of the one or more cores of the one or more other processors, send an acknowledgement to the core that initiated the global demap request that the request for invalidation has been satisfied.

11. The processor of claim 10, further comprising:
a counter configured to maintain a count of cores that have received the request to invalidate the address translation but have not yet returned an acknowledgement that the address translation has been invalidated within the core or a count of cores that have returned an acknowledgement that the address translation has been invalidated within the core;
wherein to determine whether the address translation has been invalidated within all of the plurality of cores, the demap manager is configured to determine whether a value of the counter indicates that the address translation has been invalidated within all of the plurality of cores.

12. The processor of claim 10, further comprising:
a counter configured to maintain a count of other processors that have received the request to invalidate the address translation but have not yet returned an acknowledgement that the address translation has been invalidated within the other processor or a count of processors that have returned an acknowledgement that the address translation has been invalidated within the processor;

wherein to determine whether the address translation has been invalidated, the demap manager is configured to determine whether a value of the counter indicates that the address translation has been invalidated within all of the one or more other processors.

13. The processor of claim 10, wherein the at least one of the one or more cores is further configured to ensure that any pending memory operations have been completed prior to sending the request for invalidation of an address translation.

14. The processor of claim 10, wherein to send a request to the plurality of cores, the demap manager is configured to broadcast or multicast a request to demap one or more entries of a translation lookaside buffer.

15. A system, comprising:
one or more processors; and
a memory coupled to the one or more processors and storing program instructions executable by the one or more processors;
wherein at least one of the one or more processors comprises:
one or more cores, at least one of which is configured to send a global demap request for invalidation of an address translation, wherein the address translation maps a virtual memory address or a real memory address to a physical memory address; and
a hardware unit of the processor separate from the one or more cores, wherein the hardware unit comprises a demap manager configured to:
receive the global demap request for invalidation of an address translation;
in response to the global demap request, perform both an internal demap operation and an external demap operation;
wherein to perform the internal demap operation the demap manager is configured to send a request to a plurality of cores of the processor to invalidate the address translation within each core;
wherein to perform the external demap operation the demap manager is configured to send a request to one or more other demap managers of one or more other processors to invalidate the address translation in one or more cores of the one or more other processors;
receive an internal acknowledgement that the address translation has been invalidated within at least one of the plurality of cores of the processor;
receive an external acknowledgement from at least one of the one or more other processors that the address translation has been invalidated within the at least one of the one or more other processors;
determine whether the address translation has been invalidated within all of the plurality of cores of the processor and all of the one or more cores of the one or more other processors; and
in response to determining that the address translation has been invalidated within all of the plurality of cores of the processor and all of the one or more cores of the one or more other processors, send an acknowledgement to the core that initiated the global demap request that the request for invalidation has been satisfied.

16. The system of claim 15, wherein the at least one of the one or more processors further comprises:
a counter configured to maintain a count of cores that have received the request to invalidate the address translation but have not yet returned an acknowledgement that the address translation has been invalidated within the core or a count of cores that have returned an acknowledgement that the address translation has been invalidated within the core;
wherein to determine whether the address translation has been invalidated within all of the plurality of cores, the demap manager is configured to determine whether a value of the counter indicates that the address translation has been invalidated within all of the plurality of cores.

17. The system of claim 15, wherein the at least one of the one or more processors further comprises:
a counter configured to maintain a count of other processors that have received the request to invalidate the address translation but have not yet returned an acknowledgement that the address translation has been invalidated within the other processor or a count of processors that have returned an acknowledgement that the address translation has been invalidated within the processor;
wherein to determine whether the address translation has been invalidated, the demap manager is configured to determine whether a value of the counter indicates that the address translation has been invalidated within all of the one or more processors other than the at least one of the one or more processors.

* * * * *